US010668823B2

(12) United States Patent
Herb et al.

(10) Patent No.: US 10,668,823 B2
(45) Date of Patent: Jun. 2, 2020

(54) SMART CRUISE CONTROL AND ADAS FOR RANGE EXTENSION

(71) Applicant: NIO USA, Inc., San Jose, CA (US)

(72) Inventors: Robert Herb, Morgan Hill, CA (US); Thomas Fritz, Ann Arbor, MI (US)

(73) Assignee: NIO USA, Inc., San Jose, CA (US)

( * ) Notice: Subject to any disclaimer, the term of this patent is extended or adjusted under 35 U.S.C. 154(b) by 0 days.

(21) Appl. No.: 15/280,225

(22) Filed: Sep. 29, 2016

(65) Prior Publication Data

US 2018/0043793 A1 Feb. 15, 2018

Related U.S. Application Data

(60) Provisional application No. 62/372,763, filed on Aug. 9, 2016.

(51) Int. Cl.

*B60L 15/20* (2006.01)
*B60W 10/08* (2006.01)
*B60W 10/18* (2012.01)
*B60W 30/16* (2020.01)
*B60L 7/18* (2006.01)
*B60W 50/00* (2006.01)

(52) U.S. Cl.

CPC ............ *B60L 15/2045* (2013.01); *B60L 7/18* (2013.01); *B60W 10/08* (2013.01); *B60W 10/18* (2013.01); *B60W 30/16* (2013.01); *B60W 30/162* (2013.01); *B60W 50/0097* (2013.01); *B60K 2310/244* (2013.01); *B60L 2240/12* (2013.01); *B60L 2240/62* (2013.01); *B60L 2240/642* (2013.01); *B60L 2260/24* (2013.01); *B60L 2260/32* (2013.01); *B60W 2050/0083* (2013.01); *B60W 2550/142* (2013.01); *B60W 2550/143* (2013.01); *B60W 2720/10* (2013.01); *B60W 2750/308* (2013.01); *Y02T 10/645* (2013.01); *Y02T 10/7283* (2013.01); *Y02T 10/7291* (2013.01); *Y02T 90/16* (2013.01); *Y02T 90/162* (2013.01)

(58) Field of Classification Search

CPC combination set(s) only.
See application file for complete search history.

(56) References Cited

U.S. PATENT DOCUMENTS

| | | | | |
|---|---|---|---|---|
| 2015/0165905 A1* | 6/2015 | Filev | B60K 31/00 | 701/94 |
| 2015/0314790 A1* | 11/2015 | Deragarden | B60W 30/16 | 703/8 |
| 2016/0054735 A1* | 2/2016 | Switkes | G08G 1/22 | 701/23 |
| 2016/0176402 A1* | 6/2016 | Andersson | B60W 30/16 | 701/96 |
| 2017/0355369 A1* | 12/2017 | La | B60W 30/143 | |

* cited by examiner

*Primary Examiner* — Adam D Tissot
*Assistant Examiner* — Edward J Pipala
(74) *Attorney, Agent, or Firm* — Sheridan Ross P.C.

(57) ABSTRACT

A driver assistance system may be a vehicle control system configured to perform a driver assistance operation, such as implementing cruise control or performing an automated driving control operation. The control system may be configured to perform a driver assistance operation which includes at least one step which conserves energy stored in at least one battery. The control system may conserve energy by controlling a speed or following distance of a vehicle based on road parameter, such as an uphill grade or downhill grade.

17 Claims, 5 Drawing Sheets

MOTOR POWER
216
CURRENT SPEED
SET SPEED
202
SET SPEED REQUEST
218
NO ACTIVITY
10
216
214
212
218
MOTOR POWER
SET SPEED
216
CURRENT SPEED
204
NO ACTIVITY
10
216
214
212

10
12
14
16
18
20
22
24
26
28
30

SMART CRUISE CONTROL AND ADAS FOR RANGE EXTENSION

CROSS REFERENCE TO RELATED APPLICATIONS

This application claims the benefit of U.S. Provisional Patent Application No. 62/372,763, filed Aug. 9, 2016, which is incorporated by reference as if fully set forth.

FIELD OF INVENTION

The present disclosure relates to efficient use of energy for electric vehicles, and, more particularly, to a smart cruise control system and advanced driver assistance system (ADAS) for range extension of an electric vehicle.

BACKGROUND

An autonomous car is a vehicle that is capable of sensing its environment and navigating without human input. Numerous companies and research organizations have developed working prototype autonomous vehicles. Further improvements in autonomous car technology are desirable.

SUMMARY

The present disclosure is related to driver assistance systems which are optimized for energy efficiency. The driver assistance system may be a vehicle control system configured to perform a driver assistance operation, such as implementing cruise control or performing an automated driving control operation. In some aspects, the control system is configured to perform a driver assistance operation which includes at least one step that conserves energy stored in at least one battery. The control system may conserve energy by controlling a speed of a vehicle based on a road parameter, such as an uphill grade or downhill grade, presence of obstacles or traffic features, traffic density, road or weather hazards, or other parameters.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE DRAWINGS

Figure 1:
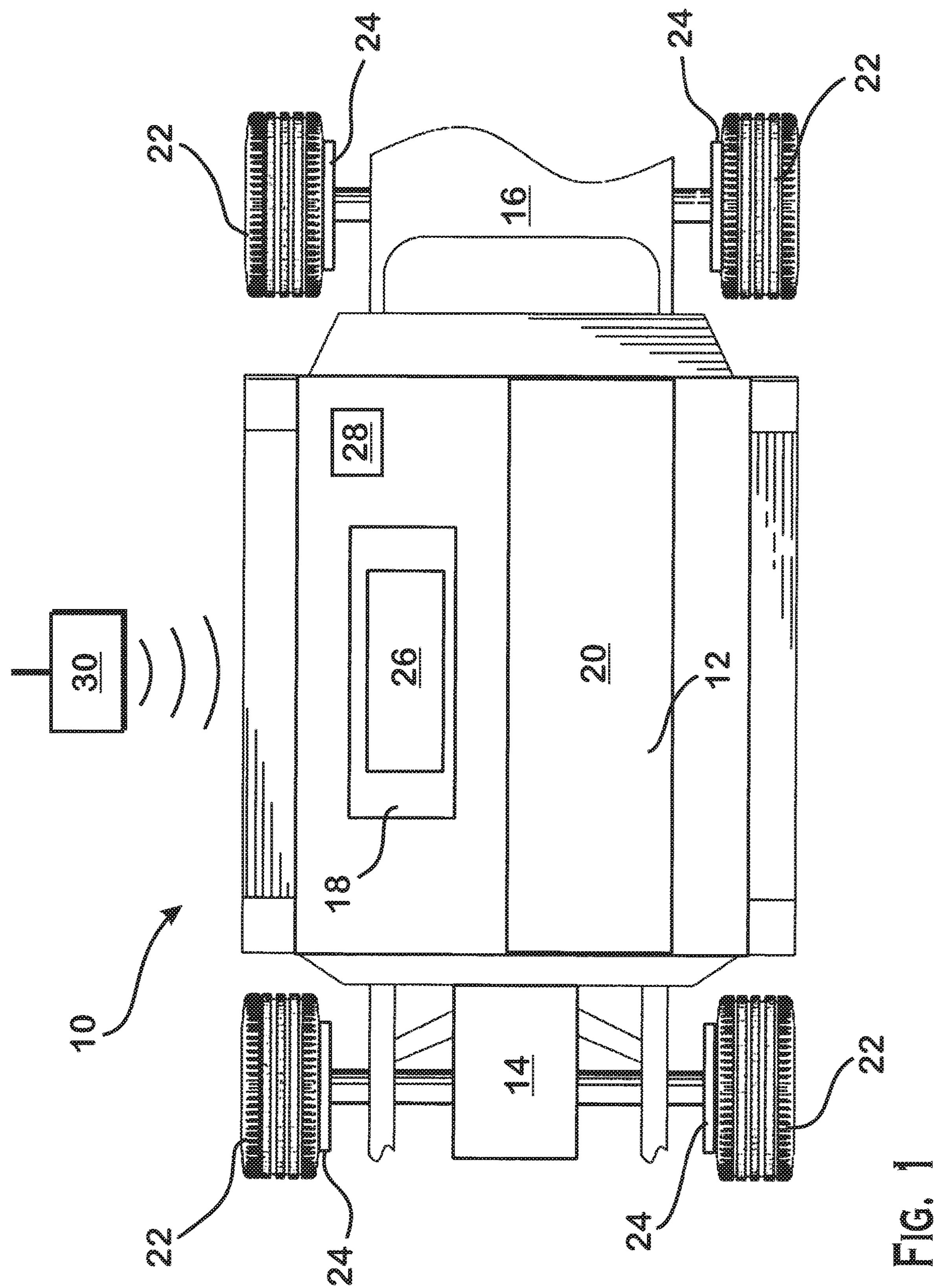
FIG. 1 is a schematic drawing of a vehicle, according to an embodiment.

FIG. 1 is a schematic drawing of a vehicle 10, according to an embodiment. The vehicle 10 includes an energy storage system 12, a motor 14 (and can include more than just one motor), a braking system 16, and a control system 18. The energy storage system 12 includes a battery 20 that stores electrical energy. The motor 14 is operatively connected to the battery 20 and is configured to produce mechanical energy to move the vehicle 10 (e.g., via wheels 22). The braking system 16 is configured to slow the vehicle 10 via one or more brakes 24. Brakes 24 include one or more friction braking mechanisms and/or may include one or more regenerative braking mechanisms that restores energy to the energy storage system 12 by reducing speed of the vehicle 10.

The control system 18 is operatively connected to the energy storage system 12, the motor 14, and the braking system 16. The control system 18 may include a controller 26 that includes, for example, a processor, memory, I/O device(s), database, etc., and the like. The control system 18 may be or may be included in a vehicle on-board computer. The control system 18 is configured to control motor power, other internal systems (e.g., passenger comfort systems, external signaling systems, and the like), and to autonomously pilot the vehicle 10. Autonomous piloting includes controlling speed and steering based on autonomous operation algorithms and on inputs received with input devices 28 (such as sensors or communication equipment like cameras, radar sensors, microphones, wireless communication equipment, and other input sensors) that are considered to be a part of the control system 18.

The input devices obtain a wide variety of information about the vehicle 10 and the surroundings of the vehicle 10. For instance, the input devices include sensors present on traditional vehicles, such as a speedometer, motor power sensors for sensing motor power, sensors for determining battery charge and power usage, and the like. The input devices also include communication devices for obtaining information about road or environmental conditions. The communication devices communicate wirelessly with an external computer system 30 to obtain traffic information, weather information, and the like. The communication devices may also obtain, from an external computer system, road parameters that define the layout of the road, including position and dimensions of the road as well as grade (incline/decline) of the road. Some road parameters may be pre-stored in a storage device accessible to the control system 18. The external computer system may be implemented as a typical computer system and include components such as a hardware processor and a hardware memory for storing instructions to be executed by the processor. The instructions would be configured to perform the functionality described herein.

The control system 18 is configured to perform a driver assistance operation for automatic control of the vehicle 10. A first example of a driver assistance operation is cruise control. Another example of a driver assistance operation is automated driving control (or other ADAS).

Cruise control is a technique in which speed of the vehicle is maintained at or near to a selected speed (also called a "set speed"). To perform cruise control, the control system 18 performs one or more steps that control a speed of the vehicle 10. For example, the control system 18 may selectively control the motor 14 to provide power to the vehicle 10 in order to accelerate to the set speed or to maintain the speed of the vehicle 10 at the set speed. In some embodiments, the control system 18 may also selectively slow the vehicle 10 (e.g., via the brakes 24 or by applying zero or negative torque (e.g., with regenerative braking) to an output shaft) to maintain the selected speed (e.g., when the vehicle travels downhill).

Automated driving control is a technique that includes certain driver safety features such as attempting to maintain a specified distance from other obstacles such as other vehicles driving on the same road as the vehicle 10. In one example, to perform automated driving control, the control system 18 performs one or more steps that control the speed of the vehicle 10 relative to the speed of other vehicles. In one example, the speed is controlled based on a distance to a vehicle in from of the vehicle 10. The distance may be measured in time (e.g., following time in seconds) or space (e.g., following distance in meters), or other measure. The control system 18 may selectively accelerate or decelerate (via motor 14) and/or slow (via brakes 24 and/or motor 14) the vehicle 10 in order to maintain a selected following distance. For example, the control system 18 may apply brakes 24 when the vehicle 20 gets too close to the vehicle in front, in order to help prevent a collision.

The control system 18 is configured to perform cruise control and automated driving control in a manner that emphasizes energy efficiency at the cost of accuracy (i.e., the control system 18 is said to "perform energy efficient operation," "perform an energy efficient driver assistance operation," to "perform an energy efficient cruise control technique," or to "perform an energy efficient automated driving control technique"). To perform an energy efficient driver assistance operation, the control system 18 loosens some of the parameters of the driver assistance operation and controls speed of the vehicle 10 in a manner that is more energy efficient than if the parameters were not loosened. For example, the control system 18 may allow a greater deviation from a selected speed or determined speed in order to conserve energy (e.g., instead of expending energy in order to match the selected or determined speed in an energy-inefficient manner).

One principle of the energy efficient operation is that certain ways of controlling speed of the vehicle 10 are more energy-efficient than other ways of controlling speed of the vehicle 10. In general, accelerating uphill consumes more energy and is less energy efficient than maintaining speed or allowing deceleration to occur uphill and then regaining the same velocity when the grade of the road is lower. Additionally, braking to decelerate (even using regenerative braking) and then applying power to accelerate back up to speed, which may occur in various situations, is less energy efficient than simply allowing the vehicle 10 to coast (i.e., not applying power from the motor to the wheels, which causes the car to slow due to rolling friction and air resistance) and then accelerating back up to speed.

Figure 2:
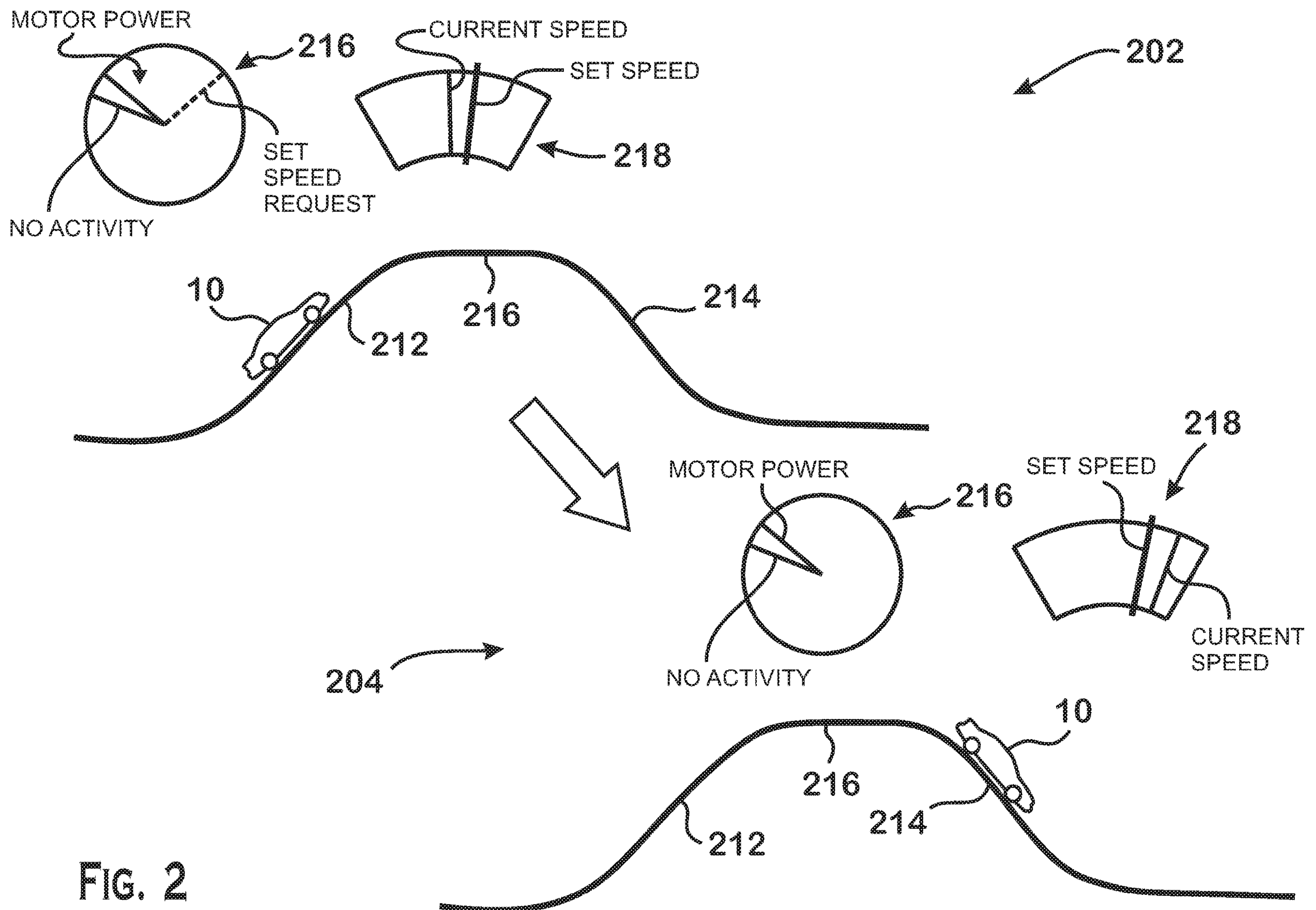
FIG. 2 illustrates an example of performing an energy efficient cruise control technique.
Figure 3:
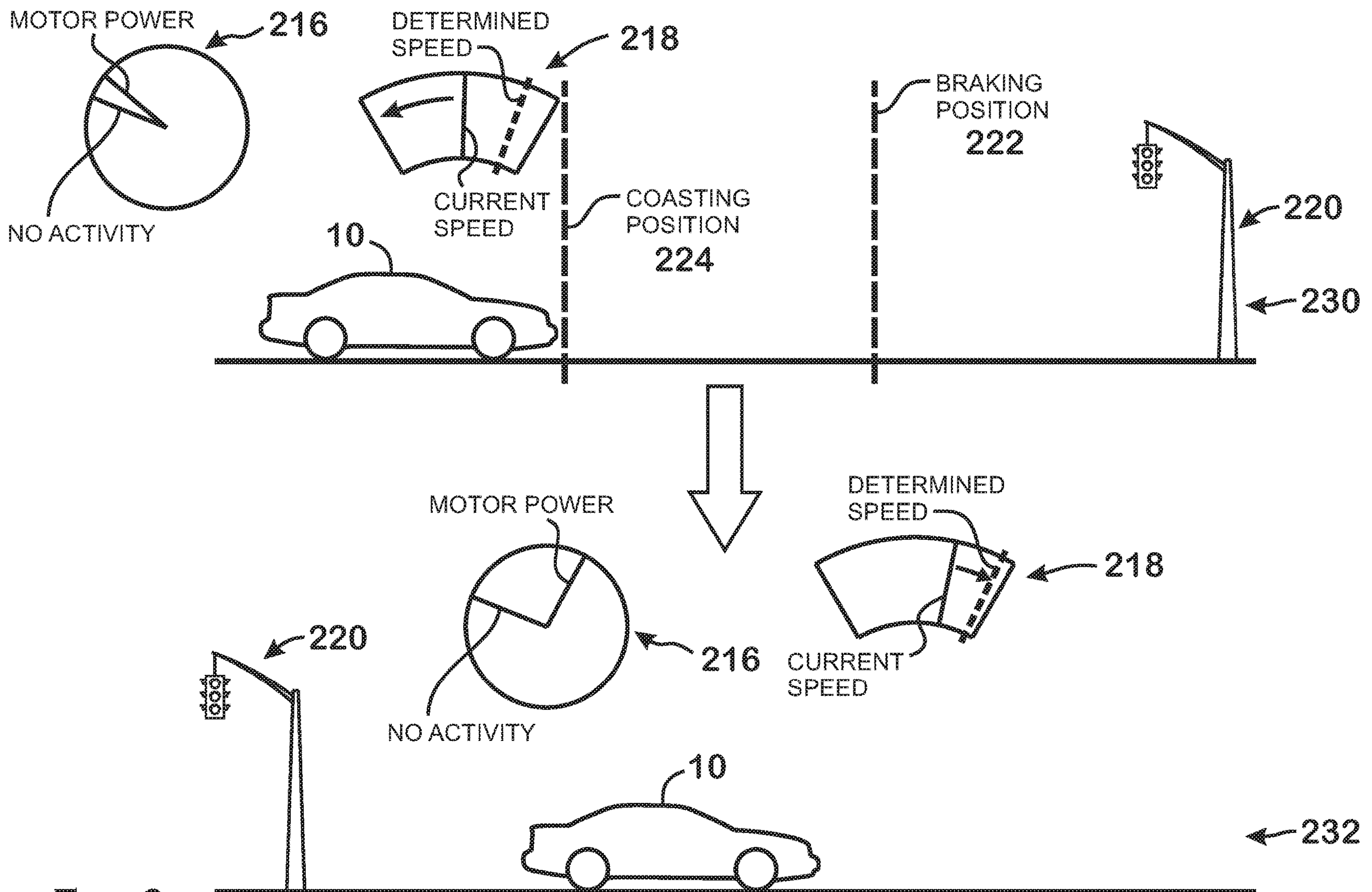
FIG. 3 illustrates an example of performing an energy efficient automated driving control technique.
Figure 4:
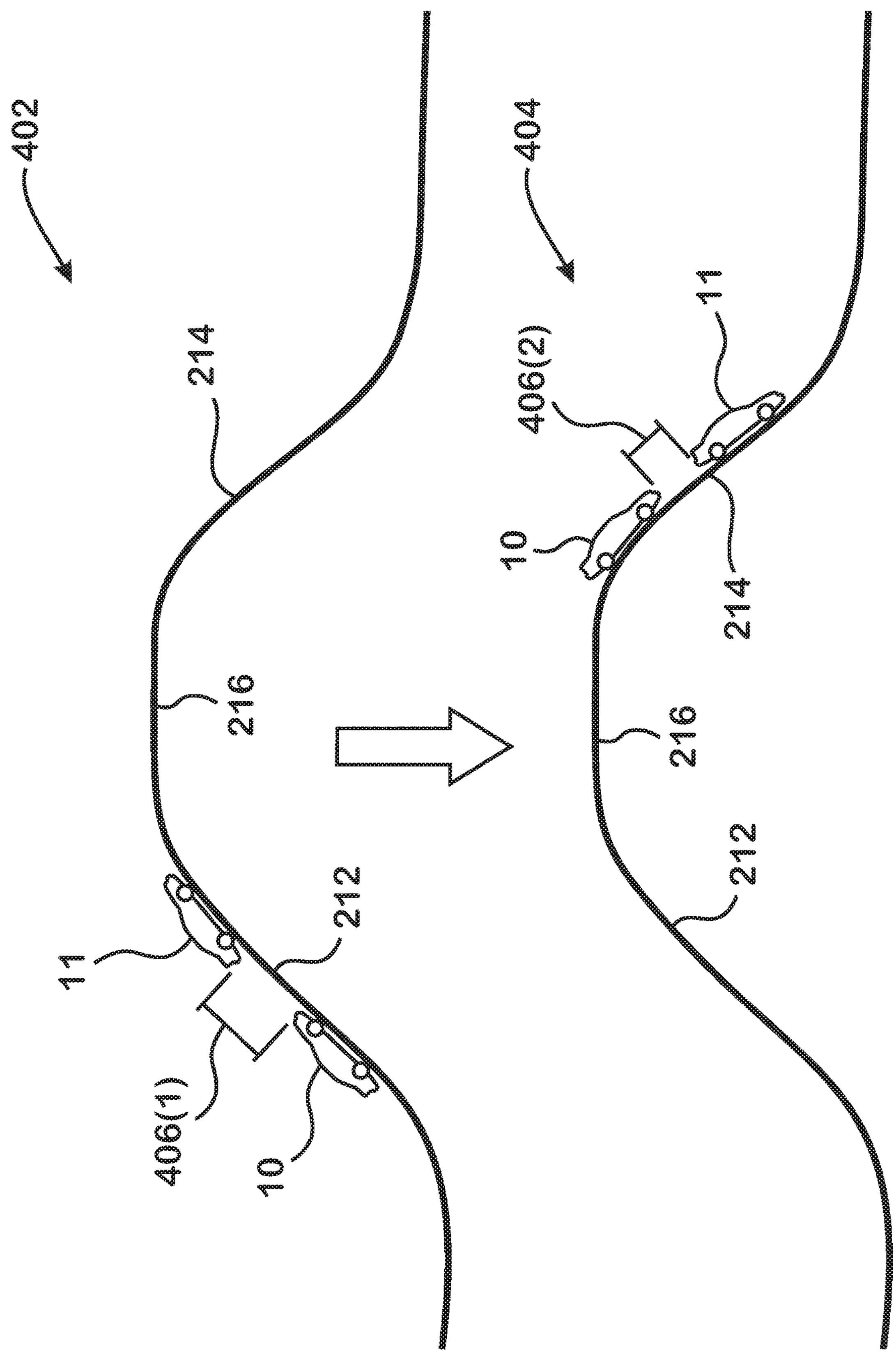
FIG. 4 illustrates another example of performing an energy efficient automated driving control technique.

To operate the vehicle 10 in an energy-efficient manner, the control system 18 analyzes one or more road parameters and/or one or more operation parameters. Based on this analysis, the control system 18 determines when and how to perform an energy efficient driver assistance operation. Examples of road parameters include current grade of the road, predicted grade of the road, presence of obstacles such as pedestrians or other obstacles, traffic density, weather conditions (i.e., whether it is raining, wet, foggy, or snowy), traffic lights, stop signs, road curve, and other parameters. Examples of operation parameters include current speed of the vehicle, a set speed (e.g., set via cruise control inputs), distance to the car in front, and other parameters. FIGS. 2-4 describe several example techniques for energy-efficient vehicle operation. It should be understood that variations in the example techniques are within the teachings of the present disclosure.

FIG. 2 illustrates an example of performing an energy efficient cruise control technique. A first state 202, where the vehicle 10 is on an incline 212, and a second state 204, where the vehicle 10 is on a decline 214, are shown. Additionally, a motor power gauge 216 is shown and a speed indicator 218 is shown.

In FIG. 2, a set speed for the cruise control to follow has been set (e.g., by a driver). The control system 18 attempts to maintain the vehicle 10 at this set speed, but allows for a deviation from that set speed that is greater than "normal" cruise control systems, in order to improve energy efficiency as compared with such "normal" cruise control systems. More specifically, the control system operates the vehicle with "normal" cruise control when the grade of the road is not above a high threshold or below a low threshold, keeping the speed of the vehicle 10 to within a particular threshold value of the set speed. When on a grade above the high threshold or below the low threshold, the vehicle 10 allows the speed of the vehicle to deviate from the set speed by a greater degree than the particular threshold value.

In the first state 202, the control system 18 has detected that the vehicle 10 is on an incline 212 (a section of road having a grade above a high threshold value). Such detection may be done through use of any known sensors, by using the road information retrieved from the external computer system 30, by sensing variations between motor power and speed (where higher motor power needed to maintain the same speed would indicate a higher incline and lower motor power for the same speed would indicate a lower incline) or through any other technically feasible manner. In response to this determination, the control system 18 causes the vehicle 10 to reduce power expenditure below what would be required to maintain the set speed or to maintain the speed of the vehicle 10 to within a certain threshold (e.g., absolute speed or percentage) of the set speed. Thus, the motor power, shown in gauge 216, is below the "set speed requirement," also shown in gauge 218. The motor power is shown as being above a minimum power that can be output by the motor ("no activity"), but the motor power may alternatively be at that minimum power. The speed of the vehicle is below the set speed, as shown in speed indicator 218, and the vehicle 10 avoids the inefficiencies associated with accelerating or maintaining a constant speed uphill.

In the second state 204, the control system 18 has detected that the vehicle 10 is on a decline 214 (e.g., on a section of road having a grade below a low threshold). Responsive to this detection, the control system 18 causes the vehicle 10 to accelerate via gravity without applying deceleration (by using brake or regenerative braking) or applying less deceleration (by using brake or regenerative braking) than with a "normal" application of cruise control. Because of this acceleration without braking, the vehicle 10 has accelerated to a speed greater than the set speed (or to a speed greater than a threshold amount above the set speed). Note that the control system 18 may have caused the vehicle 10 to accelerate while on a level portion 216 between the incline 212 and the decline 214 in order to retain some of the speed lost on the incline 212.

The pattern of incline and decline shown in FIG. 2 may repeat multiple times, such as in a series of rolling hills. In such a situation, the control system 18 may prevent or reduce acceleration on uphill portions and apply acceleration (e.g., through energy stored in the energy storage system 12) on level or downhill portions to recover speed. Throughout such operations, the control system 18 would allow for a greater deviation from the set speed than in a normal cruise control technique, where the "normal cruise control technique" is that applied when the grade of the road is not very high.

In addition to decline/incline situations, cruise control may also be varied as described above when approaching other features, such as when approaching a feature that requires a reduction and then increase in speed (e.g., a reduced speed limit, encountering traffic, encountering a curve that requires a reduced speed or the like). In such situations, the control system 18 would cause the vehicle 10 to decelerate by applying less or no torque (rather than applying deceleration) prior to arriving at the feature that requires the reduction in speed and then applying torque after passing that feature.

FIG. 3 illustrates an example of performing an energy efficient automated driving control technique. A specific situation for the automated driving control technique—approaching an obstacle 220 (shown as a stop light)—is shown. However, the technique illustrated in FIG. 3 may also be applied in other situations, such as when different obstacles or road features (e.g., a stop sign, a road curve requiring a reduction in speed, or in other situations where a reduction in speed is required) are approached.

In operation, the control system 18 determines a particular speed for the vehicle 10 based on a variety of parameters. This speed is referred to herein as a "determined speed." The control system 18 may determine this speed when operating the vehicle 10 fully autonomously or when operating the vehicle 10 in cruise control with safety measures for slowing down when approaching obstacles switched on. When the vehicle approaches the obstacle 220 (e.g., a stop light), the control system 18 determines that the vehicle 10 should slow down. In a "normal" operation, the control system 18 identifies a braking position 222, which generally comprises a "safe" position at which to begin applying brakes, and causes the vehicle 10 to begin braking at that position.

However, because braking and then reaccelerating is less efficient than coasting and reaccelerating, instead of braking, the control system 18 identifies a coasting position 224 and causes the vehicle 10 to coast (as indicated by the motor power gauge 216) starting from that coasting position 224. (This is shown in state 230). Coasting comprises not applying any motor power but also not applying the brakes (or negative torque) for at least a portion of the coasting operation. The control system 18 may apply brakes if the vehicle 10 needs to come to a complete stop. The control system 18 may apply braking and coasting according to an optimized braking profile that optimizes energy efficiency of the stopping or slowing process. The control system 18 may take road conditions (e.g., incline, curve, or the like), into consideration for calculation of the coasting position 224. After the vehicle 10 has passed the obstacle (or, with a stop light, after the stop light changes to indicate that the vehicle 10 may pass), the control system 18 causes the vehicle 10 to again accelerate (shown in motor power gauge 216 and speed indicator 218).

The vehicle 10 may detect presence of the stop light or other obstacle or road feature with use of a sensor 28 such as a camera. In other embodiments, road features (such as stop lights or other features) are configured to communicate wirelessly with vehicles. In such embodiments, the vehicle 10 detects presence of the stop light or other obstacle by wirelessly communicating with such road features.

FIG. 4 illustrates another example of performing an energy efficient automated driving control technique. When controlling the vehicle 10 autonomously, the control system 18 causes the vehicle 10 to maintain a particular following distance to another vehicle ahead of the vehicle 10. The following distance is chosen as a distance (a "determined distance") that allows for safety in terms of braking speed and also affords the human driver and passengers a certain level of visual comfort (e.g., preventing the vehicle 10 from appearing to be too close to the subsequent vehicle).

Typically, the control system 18 attempts to maintain the following distance to within a particular threshold. However, to operate with greater energy efficiency, when the vehicle 10 is on an incline 212 or a decline 214, the control system 18 allows the following distance to vary to a greater degree than when the vehicle 10 is on flat ground.

For example, when the vehicle 10 is on an incline (state 402), the control system 18 allows the following distance to be greater than the determined distance by an amount greater than the particular threshold described above. This greater following distance 406(1) is shown in state 402. The purpose of allowing the following distance to be greater than the determined distance by an amount greater than the particular threshold is to allow the vehicle 10 to slow down by applying less power from the motor in a similar manner as described with respect to FIG. 2. This operation is more energy-efficient than maintaining the following distance to a closer degree.

When the vehicle 10 is on a decline (state 404), the control system 18 allows the following distance to be lower than the determined distance by an amount greater than the particular threshold described above. The smaller following distance 406(2) is shown in state 404. As with state 402, the purpose of allowing the following distance to be lower as shown is to improve efficiency by allowing the vehicle to speed up via gravity.

Figure 5:
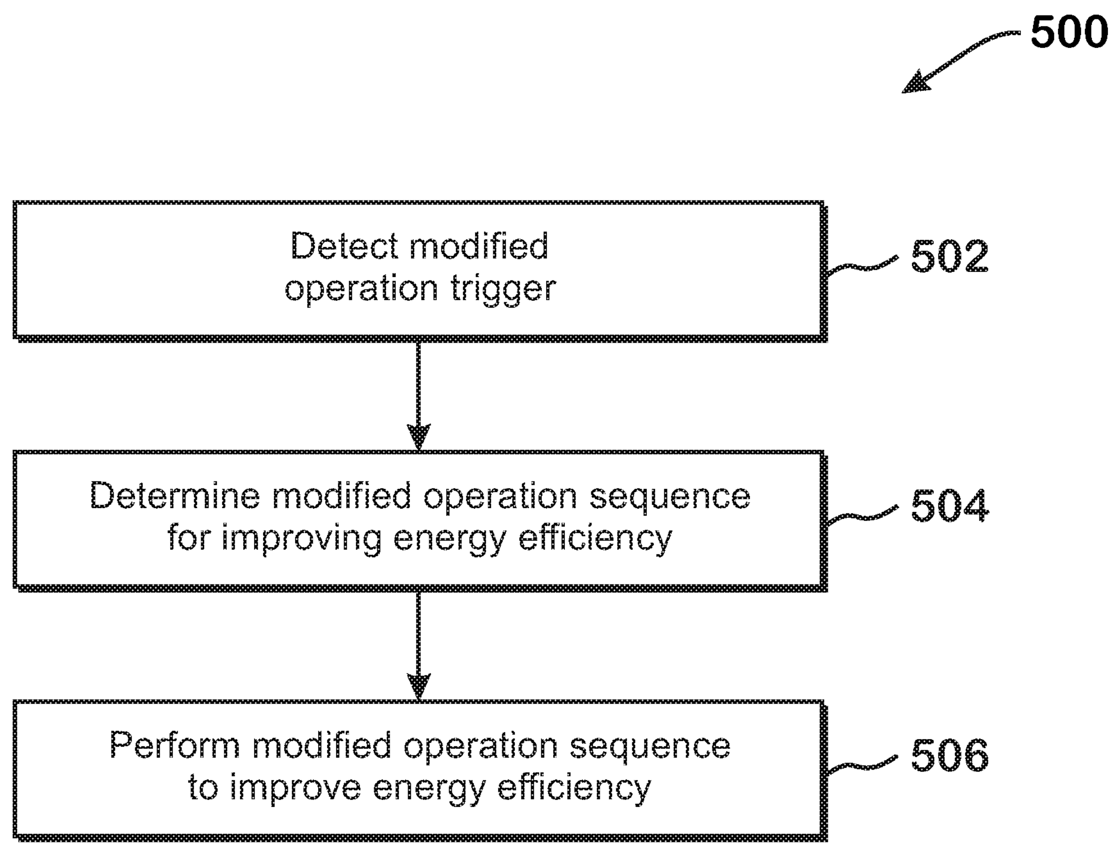
FIG. 5 is a flow diagram of a method for operating a vehicle in an energy-efficient manner, according to an example.

FIG. 5 is a flow diagram of a method 500 for operating a vehicle 10 in an energy-efficient manner, according to an example. Although described with respect to the system shown and described with respect to FIGS. 1-4, it should be understood that any system configured to perform the method, in any technically feasible order, falls within the scope of the present disclosure.

As shown, the method 500 begins at step 502, where the control system 18 of the vehicle 10 detects a "modified operation trigger." A "modified operation trigger" is a condition that causes the control system 18 to determine that adjustments to vehicle operation can improve energy efficiency. The modified operation trigger can include any one or more of the conditions described above with respect to FIGS. 1-4, or others. For example, the modified operation trigger may include detection of an obstacle that requires stopping or slowing down, such as a stop light, stop sign, yield sign, or other obstacle. The modified operation trigger may also include detection of an incline above a certain grade or a decline above a certain grade, either while cruise control is set, or while the vehicle 10 is otherwise operating autonomously (e.g., maintaining a following distance to a vehicle in front). The modified operation trigger may also include detection of a change in weather conditions that would require the vehicle to slow down (e.g., rain or snow), change in road conditions that would require the vehicle to slow down (a change in speed limit that would require a lowered vehicle speed, detection of a curve that would require a lowered vehicle speed, detection of traffic conditions, such as congestion, that would require lowered vehicle speed, or other conditions that would require a lowered vehicle speed), or another trigger.

At step 504, the control system 18 determines a modified operation sequence for improving energy efficiency of the vehicle 10 based on the modified operation trigger. The modified operation sequence may be any of the operations described above with respect to FIGS. 2-4, including varying the speed for cruise control beyond farther away from the set speed when on an incline or decline (FIG. 2), slowing down without applying brakes (FIG. 3), or varying following distance when on an incline or decline (FIG. 4). At step 506, the control system 18 performs the determined modified operation sequence to improve energy efficiency for the vehicle 10. This sequence would be performed as described above.

The disclosed embodiments provide a control system for a vehicle that is configured to control one or more other systems of the vehicle, such as a motor or braking system, in a manner that provides efficient use of energy stored in a battery. Associated control steps may be implemented to better conform to efficient speeds when going uphill or downhill, for example. Efficient use of the battery provides more range to the vehicle and lowers associated costs (e.g., by providing greater value for the energy used).

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A vehicle, comprising:

an energy storage system including at least one battery;

one or more motors operatively coupled to the energy storage system and configured to produce, via the energy storage system, mechanical energy, to move the vehicle;

a braking system configured to slow the vehicle via one or more brakes; and a control system operatively coupled to the one or more motors and the braking system, the control system configured to:

detect a modified operation trigger by detecting a slowing condition while the vehicle operates in cruise control, the slowing condition including a detection of an approaching stationary object, determine a modified operation sequence for improving energy efficiency of the energy storage system based on the modified operation trigger, the modified operation sequence including determining a coasting position for the vehicle based on a distance to the approaching stationary object and road conditions, the coasting position being a position at which the vehicle can begin coasting and continue coasting to stop at the approaching stationary object without use of the one or more motors and the one or more brakes from the coasting position to the approaching stationary object, and perform the modified operation sequence to improve energy efficiency of the energy storage system by controlling the vehicle to begin coasting at the coasting position and continue coasting to stop at the approaching stationary object without use of the one or more motors and the one or more brakes.

2. The vehicle of claim 1, wherein the vehicle operates in cruise control to keep the speed of the vehicle within a threshold amount of speed of a set speed, the control system is configured to detect the modified operation trigger by:

detecting a road condition in which the vehicle operates in cruise control over a road having either an incline above a road incline threshold or a decline below a road decline threshold.

3. The vehicle of claim 2, wherein the control system is further configured to:

responsive to detecting the road condition, allowing the speed of the vehicle while operating the vehicle in cruise control to exceed the threshold amount of speed.

4. The vehicle of claim 1, wherein the slowing condition further includes one of a road feature, a road obstacle, or an adverse weather condition.

5. The vehicle of claim 1, further comprising causing the vehicle to accelerate after the vehicle has stopped at the approaching stationary object.

6. The vehicle of claim 1, wherein the approaching stationary object is detected by at least one sensor.

7. A method for operating a vehicle efficiently, the vehicle including an energy storage system including at least one battery, one or more motors operatively coupled to the energy storage system and configured to produce, via the energy storage system, mechanical energy, to move the vehicle, a braking system configured to slow the vehicle via one or more brakes, and a control system operatively coupled to the one or more motors and the braking system, the method comprising:

detecting a modified operation trigger by detecting a slowing condition while the vehicle operates in cruise control, the slowing condition including a detection of an approaching stationary object;

determining a modified operation sequence for improving energy efficiency of the energy storage system based on the modified operation trigger, the modified operation sequence including determining a coasting position for the vehicle based on a distance to the approaching stationary object and road conditions, the coasting position being a position at which the vehicle can begin coasting and continue coasting to stop at the approaching stationary object without use of the one or more motors and the one or more brakes from the coasting position to the approaching stationary object; and performing the modified operation sequence to improve energy efficiency of the energy storage system by controlling the vehicle to begin coasting at the coasting position and continue coasting to stop at the approaching stationary object without use of the one or more motors and the one or more brakes.

8. The method of claim 7, wherein detecting the modified operation trigger comprises:

detecting a condition in which the vehicle operates in cruise control over a road having either an incline above a road incline threshold or a decline below a road decline threshold.

9. The method of claim 8, further comprising:

responsive to detecting the condition, allowing the speed of the vehicle while operating the vehicle in cruise control to vary.

10. The method of claim 7, wherein the slowing condition further includes one of a road feature, a road obstacle, or an adverse weather condition.

11. The method of claim 7, further comprising causing the vehicle to accelerate after the vehicle has stopped at the approaching stationary object.

12. The method of claim 7, wherein the approaching stationary object is detected by at least one sensor.

13. A control system for controlling a vehicle that includes an energy storage system including at least one battery, one or more motors operatively coupled to the energy storage system and configured to produce, via the energy storage system, mechanical energy, to move the vehicle, a braking system configured to slow the vehicle via one or more brakes, and a control system operatively coupled to the one or more motors and the braking system, the control system comprising:

a memory storing instructions; and a processor configured to execute the instructions stored in the memory to perform a method for controlling the vehicle, the method comprising:

detecting a modified operation trigger by detecting a slowing condition while the vehicle operates in cruise control, the slowing condition including a detection of an approaching stationary object, determining a modified operation sequence for improving energy efficiency of the energy storage system based on the modified operation trigger, the modified operation sequence including determining a coasting position for the vehicle based on a distance to the approaching stationary object and road conditions, the coasting position being a position at which the vehicle can begin coasting and continue coasting to stop at the approaching stationary object without use of the one or more motors and the one or more brakes from the coasting position to the approaching stationary object, and performing the modified operation sequence to improve energy efficiency of the energy storage system by controlling the vehicle to begin coasting at the coasting position and continue coasting to stop at the approaching stationary object without use of the one or more motors and the one or more brakes.

14. The control system of claim 13, wherein detecting the modified operation trigger comprises:

detecting a condition in which the vehicle operates in cruise control over a road having either an incline above a road incline threshold or a decline below a road decline threshold.

15. The control system of claim 13, further comprising causing the vehicle to accelerate after the vehicle has stopped at the approaching stationary object.

16. The control system of claim 13, wherein the approaching stationary object is detected by at least one sensor.

17. The control system of claim 13, wherein the slowing condition further includes one of a road feature, a road obstacle, or an adverse weather condition.

* * * * *